July 5, 1960  G. DOMMANN  2,943,728
MINING CONVEYORS
Filed Aug. 9, 1955
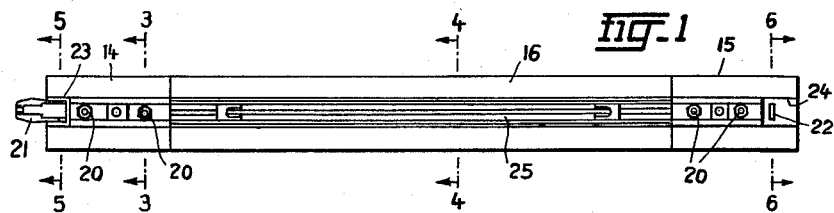
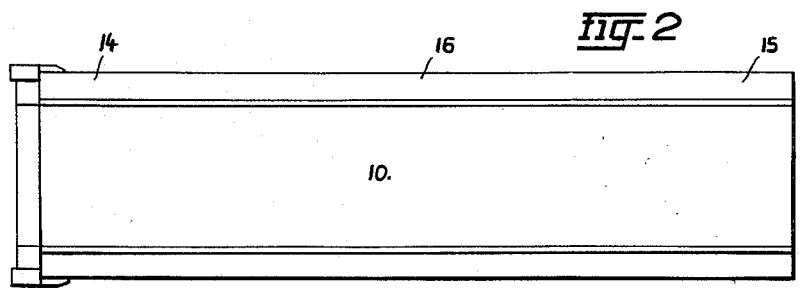
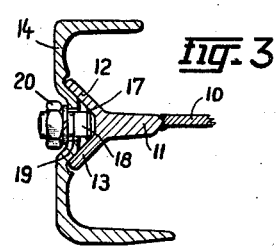 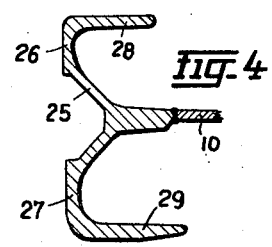
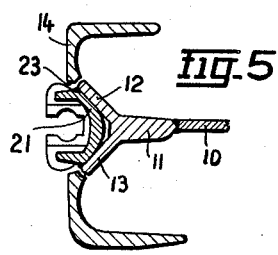 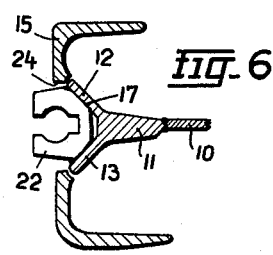
INVENTOR
GÜNTHER DOMMANN
BY Burgess and Dinklage
ATTORNEYS

United States Patent Office 2,943,728
Patented July 5, 1960

2,943,728

MINING CONVEYORS

Günther Dommann, Wethmar, near Lunen/Westphalia, Germany, assignor to Gewerkschaft Eisenhutte Westfalia, Wethmar, near Lunen, Germany, a corporation of Germany Filed Aug. 9, 1955, Ser. No. 527,387

9 Claims. (Cl. 198—204)

This invention relates to improvements in mining conveyors. More particularly, it relates to an improved construction for a trough section of a double-chain mining conveyor.

Double-chain mining conveyors are well known and are being used in ever-increasing numbers in modern day mining due to their high conveying capacity. The trough sections of these mining conveyors have two opposed vertical side walls centrally joined by a horizontally extending bottom portion. Each of the side walls may, for example, have a cross-sectional shape substantially approximating a W on its side. The side walls are so positioned that the tops of the W face each other with the bottom portion of the conveyor joined as, for example, by welding to the apex of the central portion of each W cross-section. The individual trough sections are positioned longitudinally one beside the other to form an elongated longitudinally extending trough. Continuous parallel scraper flights with each scraper joined at each end to a separate continuous chain are drawn by the chains along the top surface of the bottom portion and return below the bottom portion. These flights of scrapers are thus connected to the chains like rungs to a ladder and will cause the conveyance of the material such as coal which is placed on the top surface of the bottom portion. The side wall portions will retain the material in a transverse direction. The flights of scrapers are driven, for example, by means of a sprocket wheel positioned at the end of the conveyor, over which the chains pass, and which in turn is driven by any suitable drive means.

The individual trough sections of the conveyor are connected to each other so as to allow a limited horizontal and vertical motion therebetween, so that the conveyor as a whole is somewhat flexible and may, for example, assume the contours of the mine floor on which it rests and the mine face along which it extends.

The conveyor, though not limited to this use, is excellently suited for use in combination with a planar cuting head to form a mining planer machine.

An embodiment of such a conveyor is, for example, described in my co-pending application, Serial No. 354,605, filed May 12, 1953, now Patent No. 2,818,164.

In use, it has been found that the trough sections of the conveyor are subjected to a highly uneven wear. Thus, for example, in operation portions of the side walls may need replacement due to wear, while the remainder of the trough section is still in fairly good condition. It has been proposed to provide the trough sections with replaceable side walls. For this purpose the trough bottom portion, together with the connecting portion of the side walls, is cut off from the remaining parts of the side walls and reassembled with new side walls. This, however, resulted in a diminishing in size of the trough cross-section so that the same could not be used in conjunction with the other trough sections to form the longitudinally extending conveyor. In addition, the reduction in width of the trough required a change in the scraper flights driving stations. In addition, the replacement of side walls could only be made after the trough section had been completely removed from the conveyor and could not be made with the conveyor assembled. This was very time consuming and troublesome. Further, the side walls were not subject to a uniform wear over their entire length but were subject to the most wear at their longitudinal ends due to the flexing of the individual trough sections at these portions.

One object of this invention is a conveyor trough section for a double-chain scraper flight conveyor which allows the replacing of the worn portions of the side walls without the abovementioned disadvantages. This, and still further objects, will become apparent from the following description read in conjunction with the drawings in which:

Fig. 1 is a side elevation of an embodiment of a trough section of a conveyor in accordance with the invention, Fig. 2 is a plan view of the trough section shown in Fig. 1, and Figs. 3, 4, 5 and 6 are partial vertical sections of the trough shown in Fig. 1.

The trough section for the double-chain mining conveyor in accordance with the invention comprises two vertical longitudinally extending, spaced apart, parallelly opposed side walls which are centrally joined by a horizontal bottom portion in the conventional manner. In accordance with the novel feature of the invention, the longitudinal end portions of the side walls are removably connected to the trough section as, for example, to the bottom portion by bolting so that the same may be removed and replaced when worn. This will allow the removal and replacement of these portions which are subject to wear, when worn, without the necessity of removing the trough section from the conveyor. Further, no narrowing of the conveyor cross-section takes place and the repair costs are substantially less than when the entire side walls had to be replaced.

As shown in the drawing, the trough section for the double-chain mining conveyor has the two vertical longitudinally extending, spaced apart, parallelly opposed side walls 16. The side walls 16, as may be seen from Fig. 4, have the upper portion 26, the central portion 25, and the lower portion 27. These side walls preferably, as shown, have a cross-sectional shape approximating a W on its side. The side walls 16 are centrally joined by a horizontal bottom portion 10.

In accordance with the invention the longitudinal end portions 14 and 15 of the side walls 16 are removavably connected to the trough section by being removably bolted to the trough bottom portion 10.

The side edges of the bottom portion 10 adjacent the removable side walls 14 and 15 preferably have a Y- or V-shaped cross-section with the upwardly and downwardly directed portions 12 and 13, as shown in Figs. 3, 5 and 6. The portions 12 and 13 branch out from a thickened portion 11 which is connected to the bottom portion 10 proper. Screw studs 18 are welded in the crotch between the parts 12 and 13. The removable side wall portions 14 and 15 have the corresponding bores or holes 19, so that the same are positioned on the trough by passing these holes 19 over the studs 18 so that the studs extend through the holes. The removable side wall portions 14 and 15 are then secured in place by means of the nuts 20. By tightening the nuts 20, the side wall portions 14 and 15 are rigidly and securely bolted in place, since the Y- or V-shaped edges 12 and 13 of the bottom portion 10 acts as a flange or guide for these removable side wall portions.

The individual trough sections are joined together by means of the coupling elements 21 and 22. As shown, the coupling elements 21 and 22 are rigidly connected by means of welding to the V-shaped groove or crotch of the conveyor bottom. The side wall portions 14 and 15 have corresponding cutouts 23 and 24 respectively, through which the coupling elements 21 and 22 extend. The section as shown in Fig. 1 may be connected to a corresponding section by extending a bolt through the openings of the coupling elements 21 and 22. Depending upon the length of the bolt, a limited motion of the part 21 may be effected with respect to the part 22 before they contact each other when moving toward each other or the ends of the bolts when moving away.

The removable and replaceable end portions 14 and 15 of the side walls are preferably made of a material which is more wear resistant than the remaining portion of the wall 16. These portions 14 and 15 may, for example, be constructed of any desired hard material and have a correspondingly high strength since they are not welded into position.

The central portion of the conveyor trough section has the Y-shaped central portion 16 which is integral with the remainder of the side walls 26 and 27 and welded to the conveyor bottom portion 10. The central portion of the side walls 16 may, however, have a construction identical to the end portions 14 and 15 and could be, for example, removably screwed or bolted to the adjacent portion of the trough bottom which would then correspond in shape to that shown in Figs. 3, 5 and 6. Due to the lesser amount of wear which occurs at this central portion, this portion of the side wall 16 could be constructed of material of lesser strength than the portions 14 and 15. In this embodiment the portions 14 and 15 and 16 of the side walls would all be individually replaceable and it is also possible to have a single side wall extending over the entire length of 14, 15, and 16, corresponding, for example, to the construction shown in Figs. 3, 5 and 6, which would thus be replaceable as an entire unit. This single side wall portion could be made of a single material or be additionally hardened at its end portions to correspond to 14 and 15.

In operation, the individual conveyor sections, as shown in Fig. 1, are placed together to form a longitudinally extending flexible conveyor by means of the coupling elements 21 and 22. A flight of scrapers is passed over the top section of the bottom portion 10 and returns beneath this section. Any material such as coal which is thrown into the conveyor on top of the bottom surface 10 would be conveyed. When any of the wall portions 14 or 15 become worn, it is merely necessary to remove the bolts 20, slip the same off and replace the same with a new section and bolt it in place. This may be effected without the necessity of dismantling the conveyor or removing the trough section.

I claim:

1. A trough section for a double-chain mining conveyor comprising two vertical longitudinally spaced apart parallelly opposed side portions, a substantially horizontal longitudinally extending bottom portion connected to each side portion to form the said conveyor trough, said side portions having longitudinally extending removable end portions, said end portions being removably connected to said bottom portion for replacement.

2. Trough section according to claim 1, in which each said longitudinally extending end portion of said side portion is bolted to said bottom portion.

3. Trough section according to claim 1, in which the longitudinal edges of said bottom portion adjacent said removable end portions define a substantially V-shaped groove and in which said end portions of said side portions are removably fitted in contact with said groove.

4. Trough section according to claim 1, including coupling elements connected to the longitudinal end portions of the side edges of said bottom portion and openings defined through said removable end portions of said side portions surrounding said coupling elements.

5. Trough section according to claim 1, in which said side portions have a cross-sectional shape substantially approximating a W on its side, the central apex of each side portion extending horizontally in the direction of the other side portion, said bottom portion being connected to each said side portion at said apex.

6. Trough section according to claim 3, in which said removable end portions are bolted in contact with said groove.

7. Trough section according to claim 6, in which said removable end portions define an inner central portion dimensioned to fit in said groove.

8. Trough section according to claim 7 including coupling elements connected to the longitudinal edge portions of said bottom portion and openings defined through said removable end portions surrounding said coupling elements.

9. Trough section according to claim 5, in which said central apex is provided with a greater cross-sectional thickness than said bottom portion.

References Cited in the file of this patent

UNITED STATES PATENTS 2,016,994     Fleming  ---------------- Oct. 8, 1935

FOREIGN PATENTS 893,327     Germany  -------------- Oct. 15, 1953